United States Patent Office 3,267,688
Patented August 23, 1966

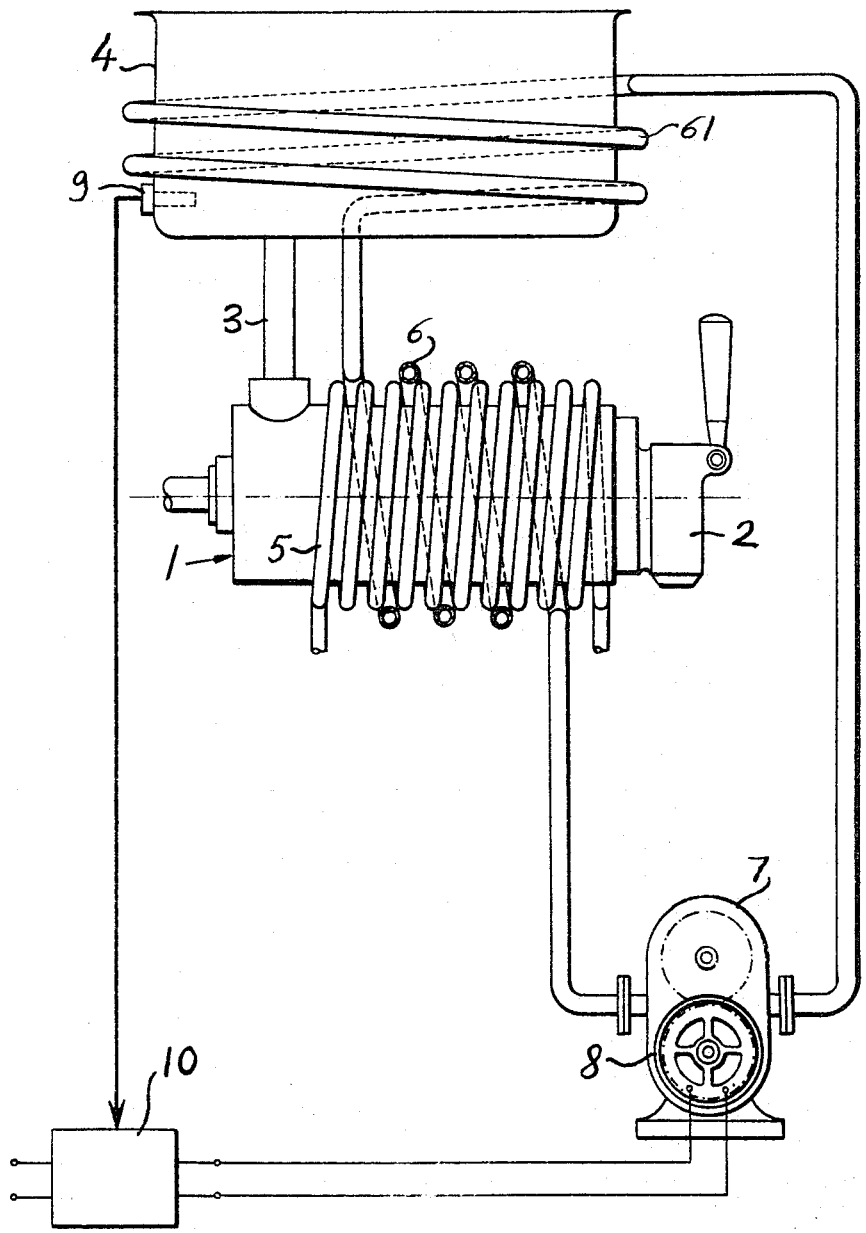

3,267,688
PRE-COOLING CIRCUIT FOR LIQUID MIXES OF ICE-CREAM MACHINES
Poerio Carpigiani, Bologna, Italy, assignor to APAW S.A., Fribourg, Switzerland
Filed June 25, 1964, Ser. No. 377,886
Claims priority, application Italy, July 5, 1963, 14,208/63
2 Claims. (Cl. 62—185)

This invention relates to the cooling of the liquid mix contained in the feed vat or tank of continuous type ice cream machines and aims to provide a pre-cooling circuit.

It is known that in the ice-cream machines of the continuous type the charge of the liquid mix to be frozen is fed into a suitable vat or feed tank from which it is caused to gradually pass automatically into the mixing cylinder of the ice-cream machine.

When the machine works intensively, this passage takes place rather rapidly, but during the rest periods the permanence of the mix to be frozen in said tank may be also prolonged.

This entails the risk of deterioration of said mix, which is composed of milk products which are subject to easily ferment at room temperature. Therefore the problem exists of preserving the mix contained in the feed tank at such a suitably low temperature as to prevent any deterioration and fermentation thereof.

Besides preventing any deterioration of the liquid mix for ice cream, the pre-cooling of this mix presents the advantage that, by feeding into the mixing cylinder a precooled mix, the amount of cold required for its transformation into ice-cream is greatly reduced and therefore the efficiency of the machine is increased, with consequent possibility of reducing the size of the mixing cylinder and to employ a motor-compressor unit having a reduced power.

It has been already attempted to solve this problem either by providing a separate cooling (by means of a self-operating motor-compressor unit) of the feed vat, or by mounting said vat into contact with or at a short distance from the mixing cylinder.

These methods however do not permit of obtaining satisfactory results. The first method, viz. that consisting in providing an independent cooling unit considerably increases the cost and the space occupied by the machine.

The second method does not permit a controlled cooling at the desired cold degree, so that this cooling is either not sufficient or excessive and ice crusts are formed in correspondence of the contact points of the freezing coils or the like with the mixing cylinder.

According to the present invention, these inconveniences are overcome in an efficient and economical manner by providing all around the evaporator jacket or coil of the refrigerating unit of the mixing cylinder a second coil (secondary coil) or a secondary cooling jacket which comes to be in heat-exchange contact with the evaporator for the cooling of the cylinder (and which will be briefly indicated hereinafter as the evaporator of the primary circuit), the circuit of the secondary coil being brought into heat-exchange contact with the liquid mix feed tank so as to suitably cool said tank.

According to a further characteristic feature of the invention, in the circuit of the secondary coil a small circulation pump is inserted, which controls the circulation of a cooled non-freezing fluid through said coil and within the secondary circuit, the operating motor of said circulation pump being controlled in a suitable manner through a thermostatic unit which is sensible to the temperature in the feed vat.

In this manner it is possible to maintain the temperature of the liquid mix in the feed vat at the exact desired value, by making use of very simple means and which may be easily mounted in a conventional ice-cream machine of the above-outlined type.

Further characteristic features and advantages of the present invention will be better apparent from the following specification of an embodiment of same, said specification being made with reference to the annexed diagrammatic drawing which shows by way of non-limiting example an embodiment of the pre-cooling circuit at a controlled temperature of the liquid mix feed vat.

With reference to the drawing, 1 denotes the mixing cylinder of a continuous type or "espresso" ice cream machine. Said cylinder carries at one end, as usual, an ice-cream dispensing unit 2 while at its opposite end it is connected, for example through an upright pipe 3, with the feed vat or tank 4 of the liquid mix to be frozen.

All around the cylinder 1 the evaporator coil 5 of the freezing unit (not shown) for refrigerating said mixing cylinder 1 is wound. Concentrically to the coil 5 of the primary cooling circuit, a second coil 6 is wound in heat-exchange relation with the preceding coil 5.

The circuit of the coil 6 (secondary circuit) is extended in the form of a coil section 61 around the vat 4, in heat-exchange relation therewith to form a closed circuit including a circulation pump which is operated by a suitable electric motor 8. A thermostat unit 9 is dipped into the vat 4 and controls, through suitable means, known per se, the operation of the motor 8 of pump 7.

The operation of the just-described device is apparent. With the ice-cream machine in operation, when the thermostat 9 feels that temperature within vat 4 is in excess of the temperature which is considered the best for the conservation of the liquid ice-cream mix, promotes the starting of the motor 8. The pump 7 thereafter causes the fluid to circulate within the secondary circuit 6, 61, so that the cooling fluid in said secondary circuit, being cooled by heat exchange from the primary circuit 5, transmits the cold to the liquid within vat 4, until the thermostat 9 again interrupts said circulation, as soon as in the vat 4 the required temperature is attained. Said temperature may be adjusted in a known manner by acting upon the thermostat 9.

By the described method, therefore, the advantages of a constant cooling at a controlled temperature of the liquid mix contained in the feed vat are attained in a simple and economical manner and this independently from other requirements of cold of the ice-cream machines, and exclusively in function of the desired degree of temperature of said mix, which degree may vary in case of liquid mixes on the basis of milk or of liquid mixes on the basis of water (for example in case of fruit ice creams) or even according to other requirements (requirement of feeding a more or less cold liquid mix, so as to enhance the readiness of the machine, thus reducing the time which is necessary for the mixing of the liquid mix within cylinder 1).

Of course, although the evaporator of the primary circuit has been shown as constituted by a coil, it is to be understood that said evaporator may be constructed in any other form adapted for the purpose aimed at, and for example in form of a jacket, the same applies also to the secondary feed tank cooling circuit.

Therefore the invention is not limited to what has been just described and shown, but comprises all those variations and modifications which come within the wider limits thereof, and substantially as claimed hereinafter.

I claim:

1. In an ice-cream machine of the type which continuously makes and/or dispenses ice cream, the combination of an ice-cream mixing and freezing chamber surrounded by an evaporator forming part of a first refrigerating fluid circuit, a vat disposed above said chamber for storing liquid ice-cream mix, a feed conduit connecting the bottom of said vat to an upper portion of said chamber for gravity feeding the mix to the chamber, and a precooling refrigerating circuit for said vat comprising a first heat exchange means mounted in physical contact with and jacketing said evaporator for heat exchange therewith, a second heat exchange means surrounding said vat, a pump, an electric motor for driving said pump, a thermostat mounted in said vat and connected to said motor and a source of power for starting and stopping said pump at predetermined temperatures of liquid mix in said vat, and conduit means connecting said pump and first and second heat exchange means in an endless, unobstructed refrigerating fluid circuit entirely independent of said first refrigerating fluid circuit, whereby refrigerant in said precooling refrigerating circuit is pumped from said first to said second heat exchange means solely in response to the operation of said thermostat and the temperature of ice-cream mix in said vat.

2. The combination recited in claim 1 wherein said evaporator is a tubular coil wound about said chamber and said first heat exchange means is a second coil wound about said evaporator.

References Cited by the Examiner
UNITED STATES PATENTS

| | | | |
|---|---|---|---|
| 2,528,574 | 11/1950 | Booth | 62—185 X |
| 2,742,176 | 4/1956 | Heyl et al. | 62—185 X |
| 3,196,627 | 7/1965 | Swenson | 62—342 X |
| 3,196,633 | 7/1965 | Rapazzini et al. | 62—348 X |

ROBERT A. O'LEARY, *Primary Examiner.*

N. R. WILSON, *Assistant Examiner.*